Figure 20:
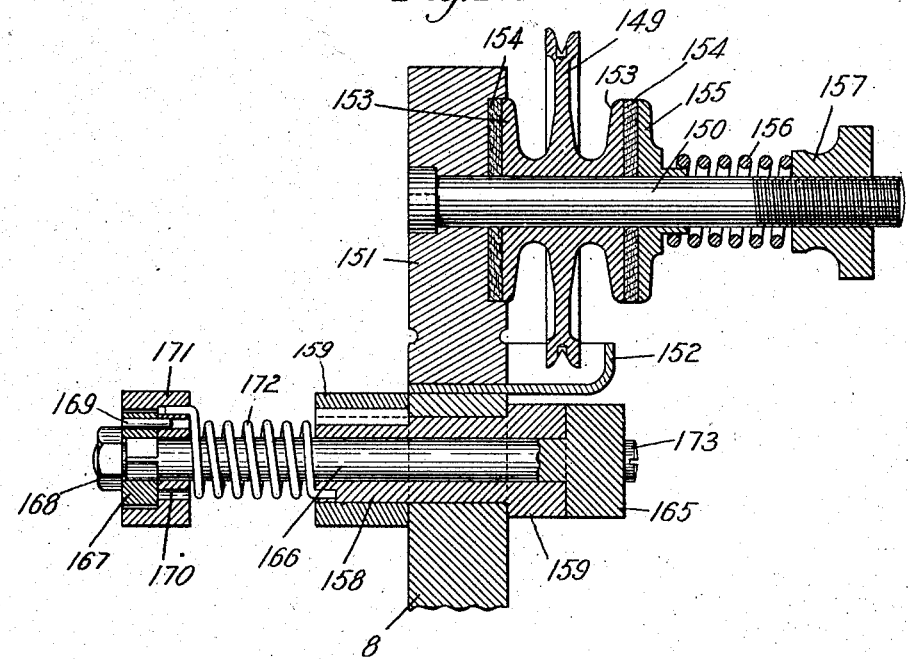

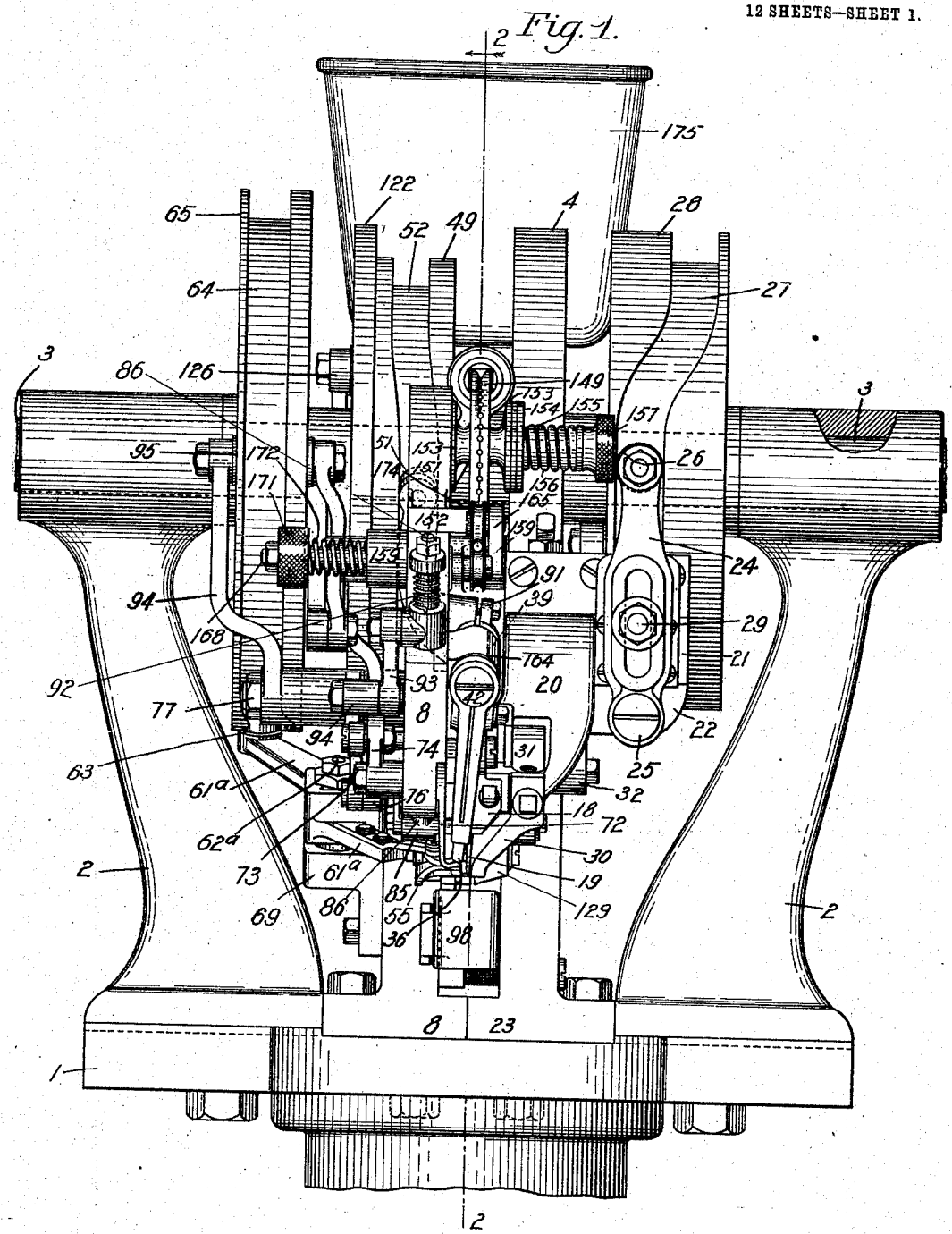

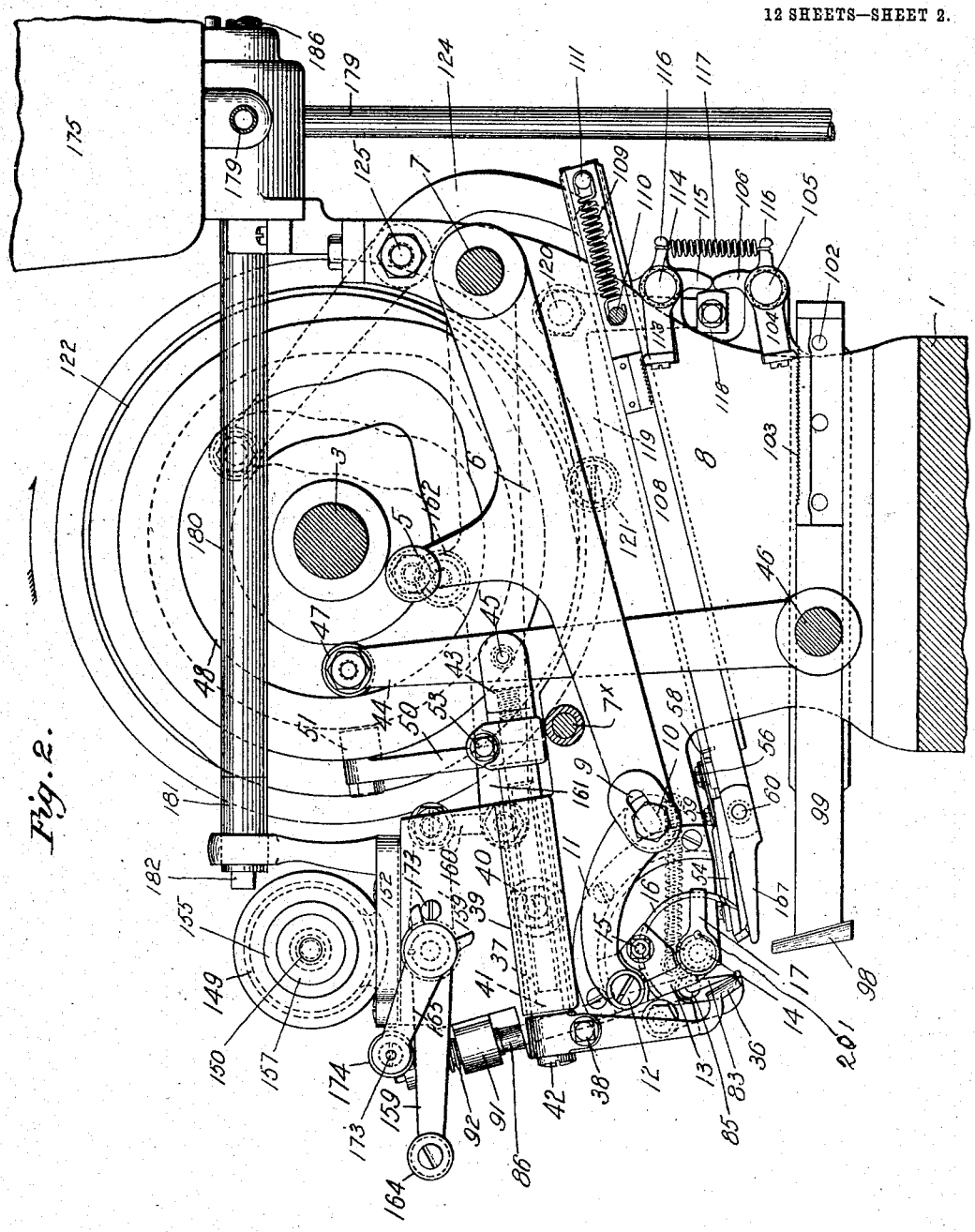

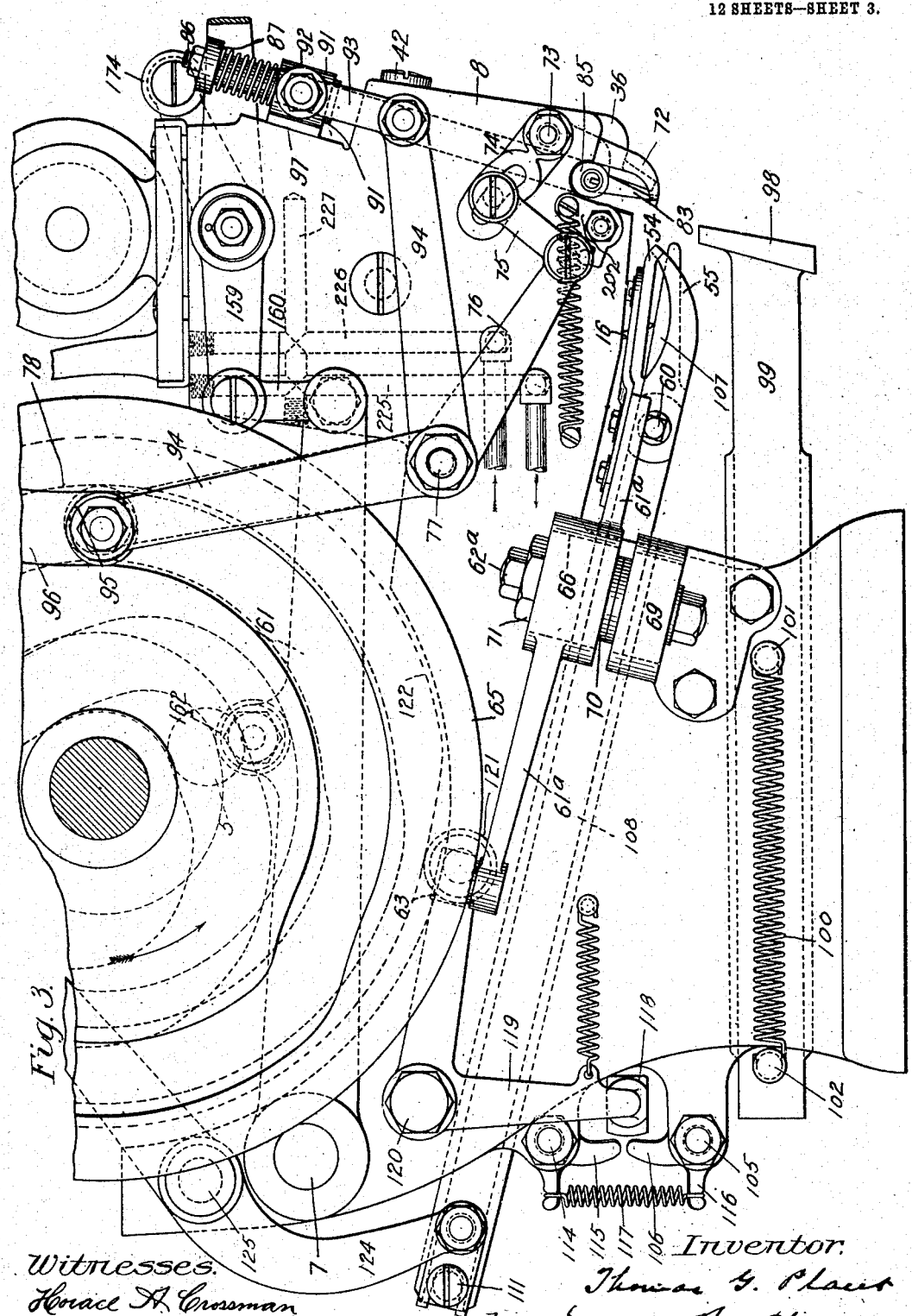

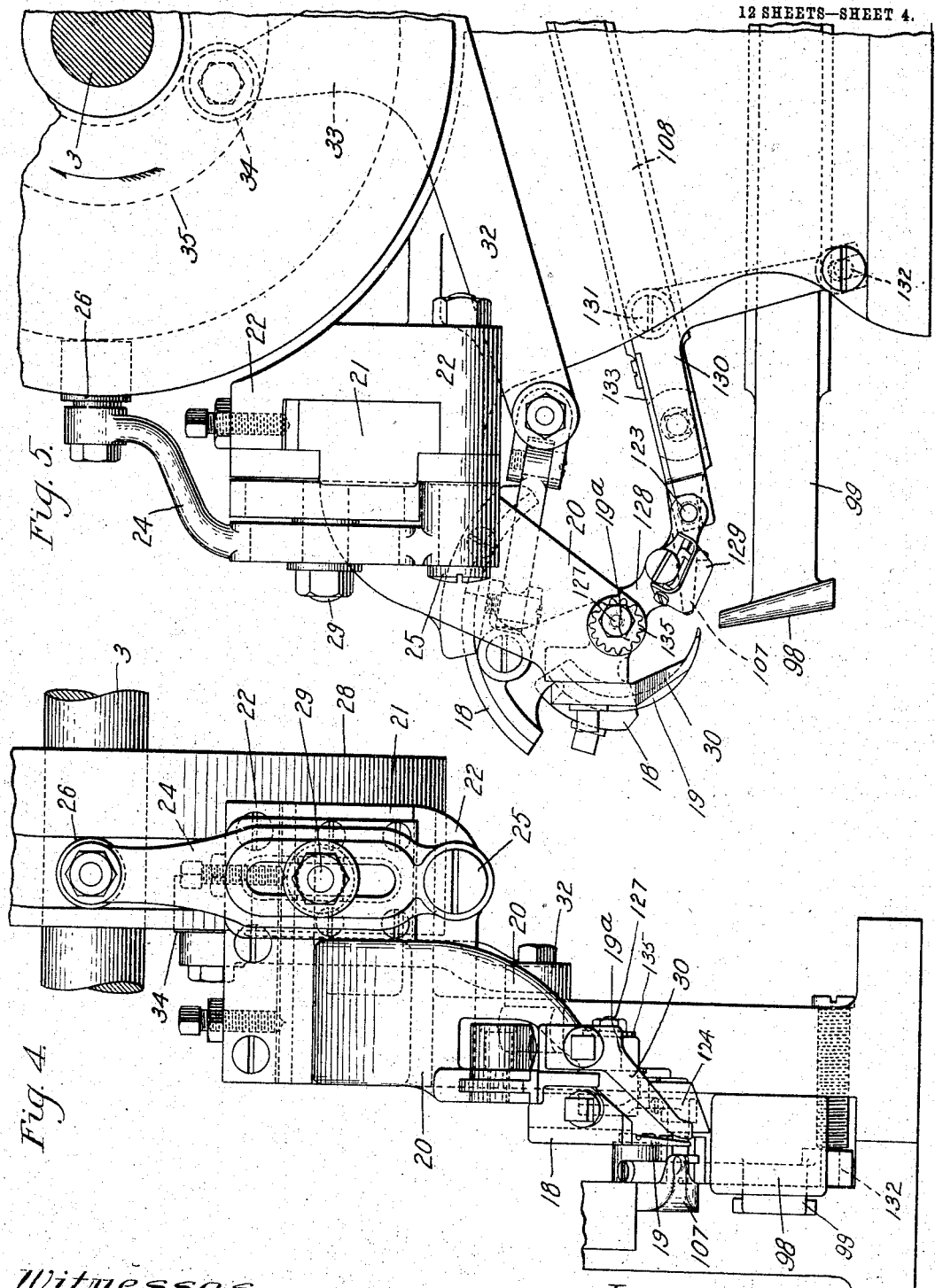

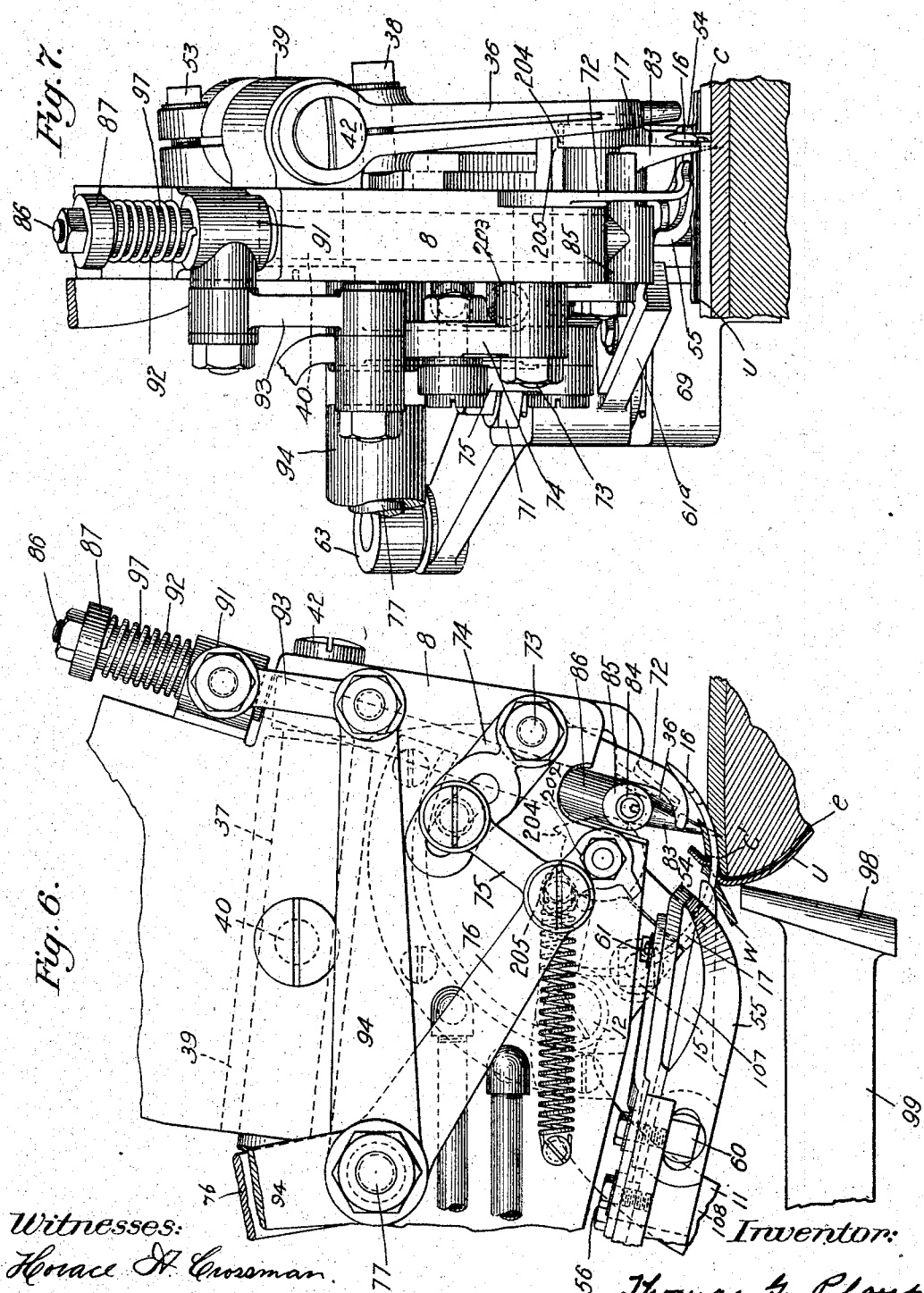

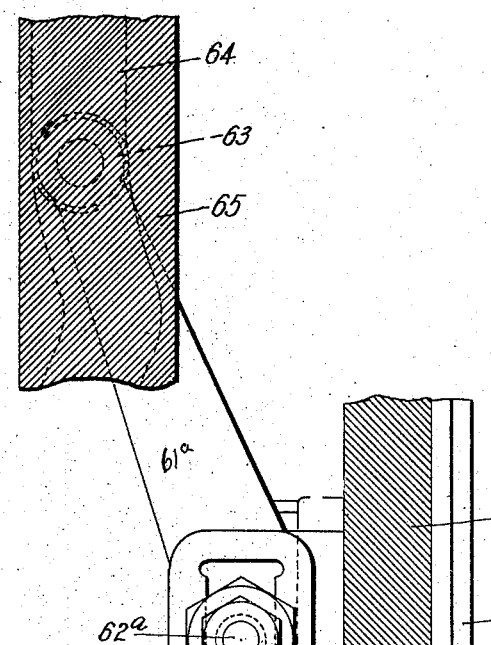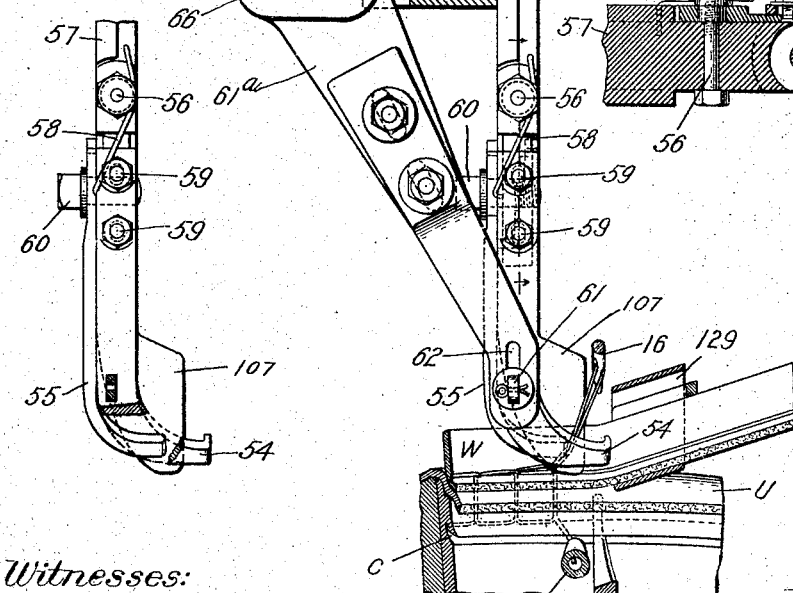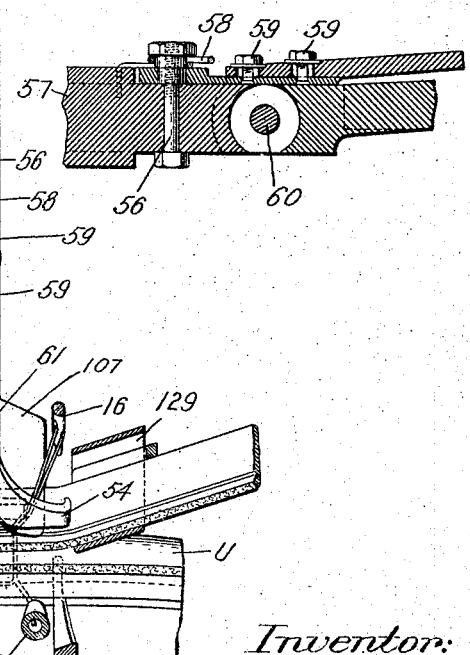

T. G. PLANT.
SEWING MACHINE.
APPLICATION FILED SEPT. 24, 1906. RENEWED NOV. 22, 1909.
947,401.
Patented Jan. 25, 1910.
12 SHEETS—SHEET 7.
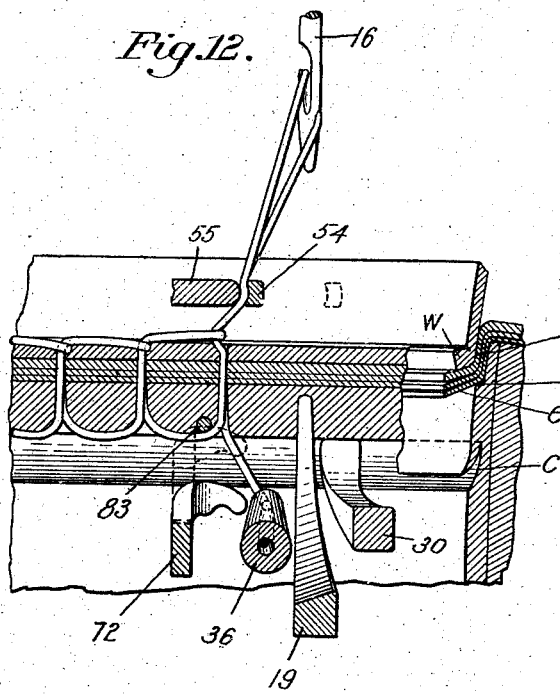
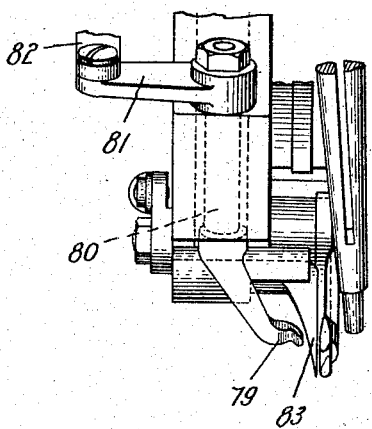

T. G. PLANT.
SEWING MACHINE.
APPLICATION FILED SEPT. 24, 1906. RENEWED NOV. 22, 1909.
947,401.
Patented Jan. 25, 1910.
12 SHEETS—SHEET 8.
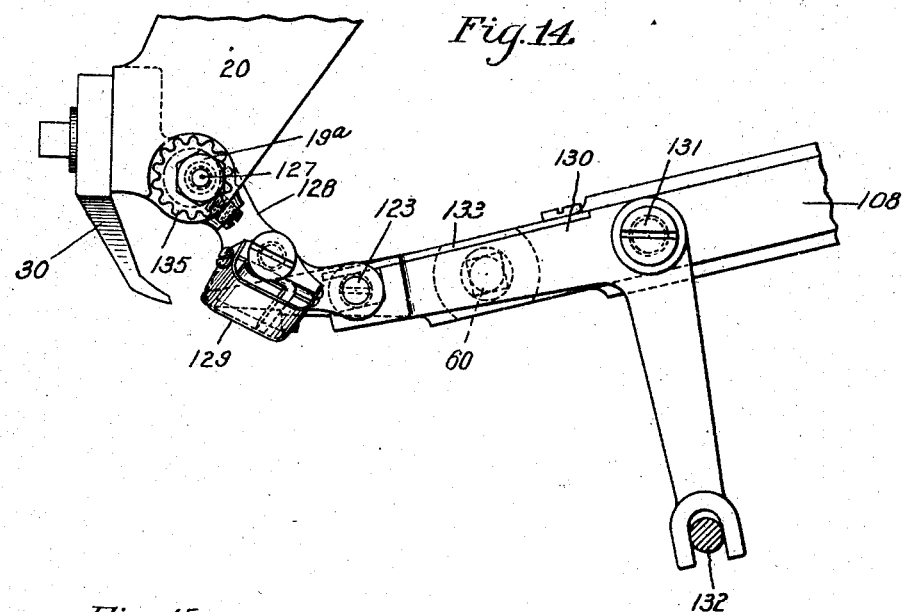
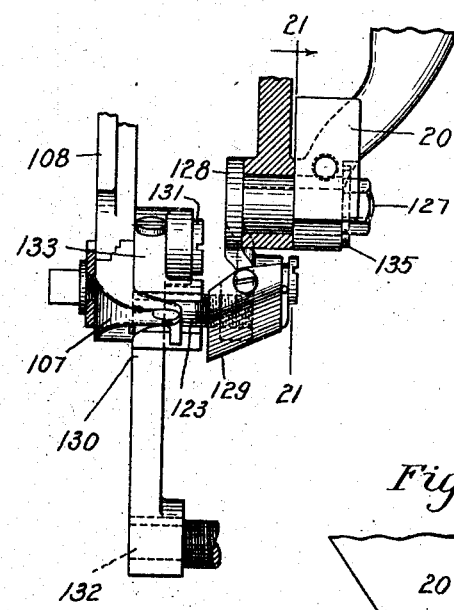
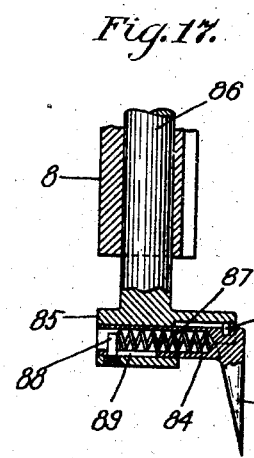
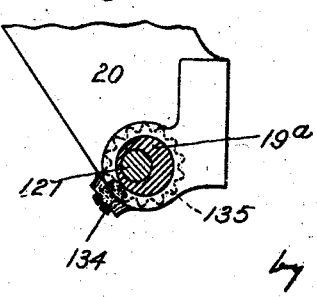
Witnesses.
Horace H. Crossman
Adolph C. Kaiser
Inventor:
Thomas G. Plant
by Emery T. Booth
Attys.

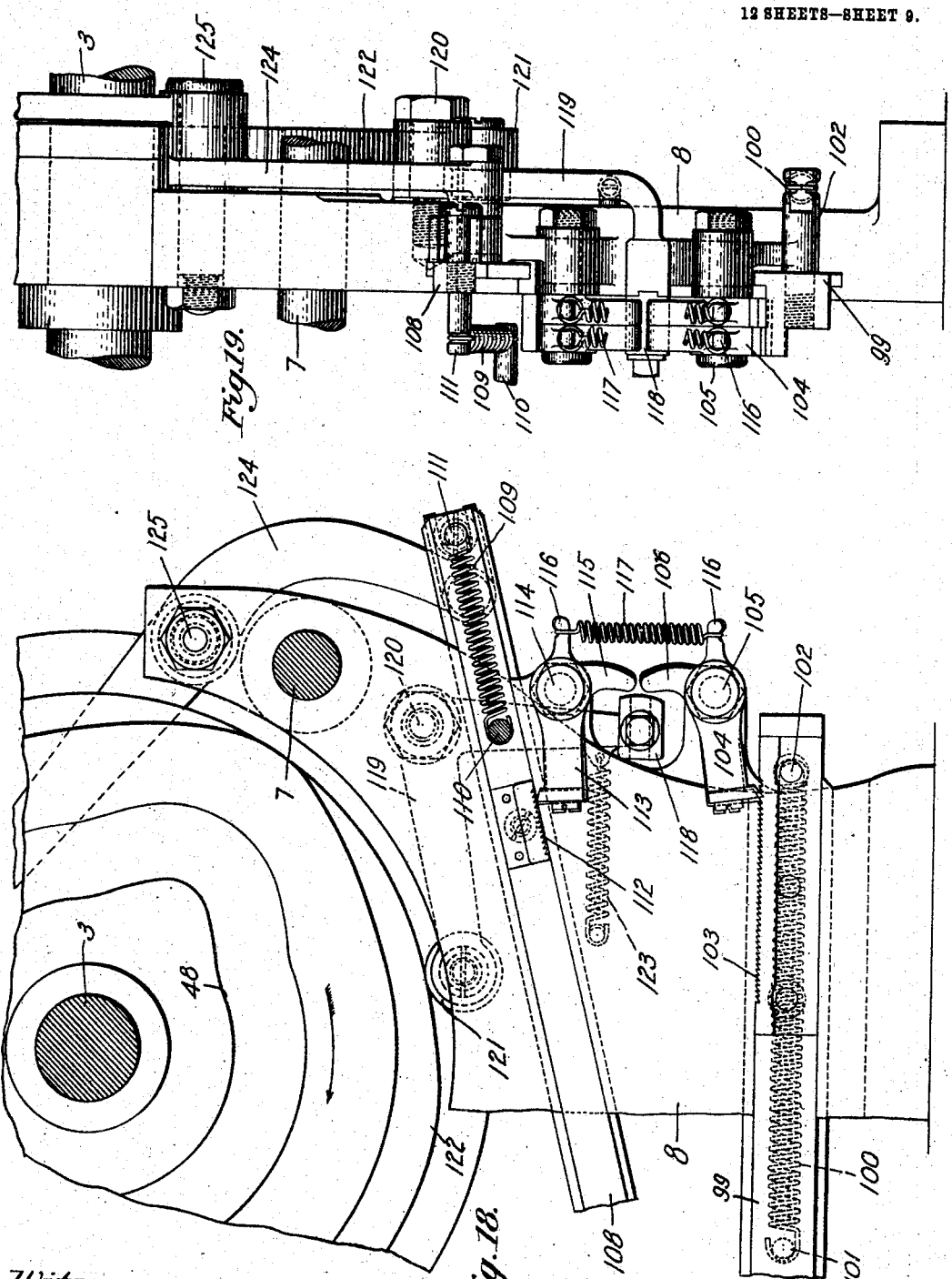

T. G. PLANT.
SEWING MACHINE.
APPLICATION FILED SEPT. 24, 1906. RENEWED NOV. 22, 1909.

947,401.

Patented Jan. 25, 1910.

12 SHEETS—SHEET 10.

Witnesses.
Horace H. Cressman.
Adolph C. T. Kaiser.

Inventor.
Thomas G. Plant
by Emery Booth
Attys

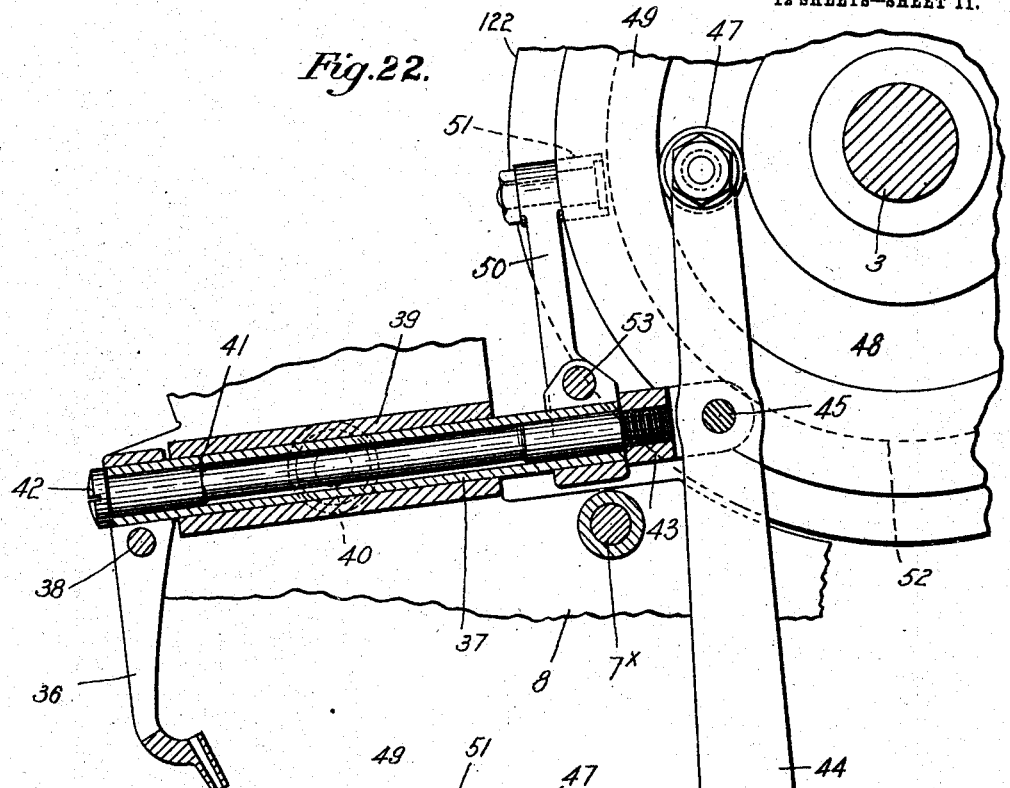
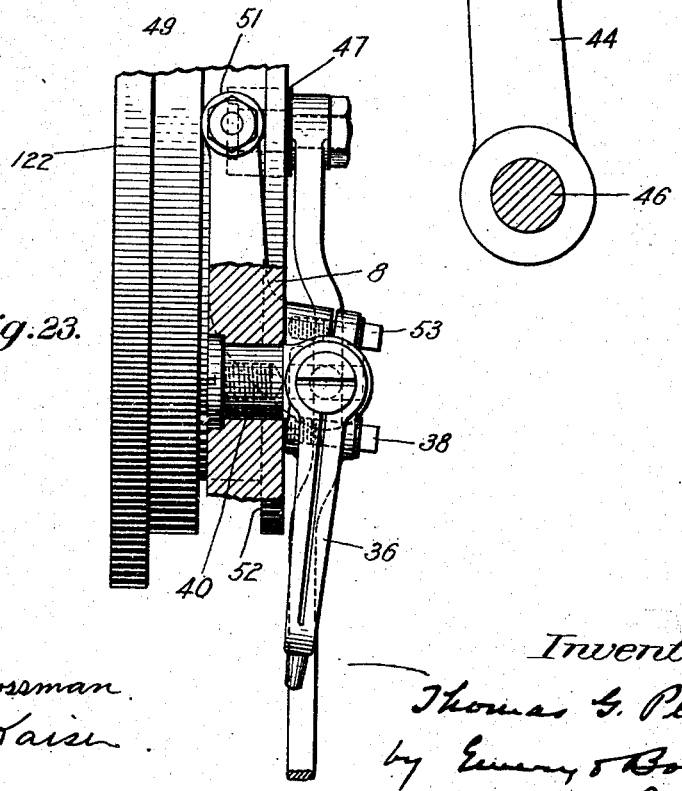

T. G. PLANT.
SEWING MACHINE.
APPLICATION FILED SEPT. 24, 1906. RENEWED NOV. 22, 1909.

947,401.

Patented Jan. 25, 1910.
12 SHEETS—SHEET 12.

WITNESSES
Wm F. Hoy
C. M. Sweeney

INVENTOR:
Thomas G. Plant
BY
Attorney.

UNITED STATES PATENT OFFICE.

THOMAS G. PLANT, OF BOSTON, MASSACHUSETTS.

SEWING-MACHINE.

REISSUED

947,401. Specification of Letters Patent. Patented Jan. 25, 1910.

Application filed September 24, 1906, Serial No. 335,903. Renewed November 22, 1909. Serial No. 529,297.

*To all whom it may concern:*

Be it known that I, THOMAS G. PLANT, a citizen of the United States, residing at Boston, in the county of Suffolk and State of Massachusetts, have invented an Improvement in Sewing-Machines, of which the following description, in connection with the accompanying drawings, is a specification, like numerals on the drawings representing like parts.

This invention in sewing machines relates more particularly and as to the larger number of its features to curved needle, wax thread machines for producing chain stitches. Such machines are used principally in the manufacture of boots and shoes for uniting the uppers and soles of turn shoes, also the uppers, insoles and welts of welt shoes. Machines of this type when used without the welt introducing devices are known in the art as "turn shoe machines" and where used with the welt introducing devices, are known as "welt machines." Since these machines are used much more extensively as "welt machines" than as "turn machines," I shall hereinafter refer to the same as "welt machines" or "welters," it being understood, however, that this term includes the use of such machines for turn or for any other class of boot and shoe or other work to which the same or any part or feature thereof may be adapted.

The object of the invention is to provide a machine of the above general character, which shall present distinct features of improvement in construction and operation over existing machines, and wherein simplicity and rapidity of action may be secured and objectionable effects incident to the prior devices be avoided, all as will be hereinafter fully described in connection with the accompanying drawings, which illustrate one form or embodiment of the invention, the invention itself being definitely set forth in the claims.

Figure 21:
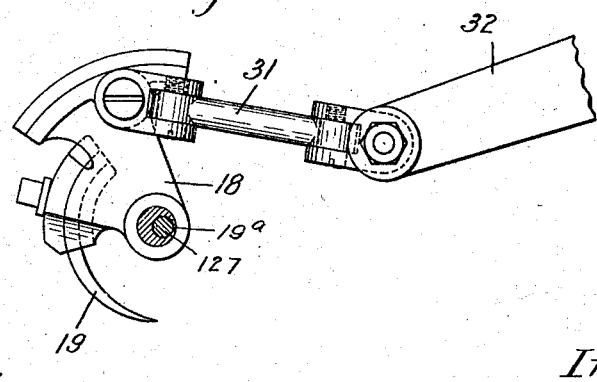
Figure 24:
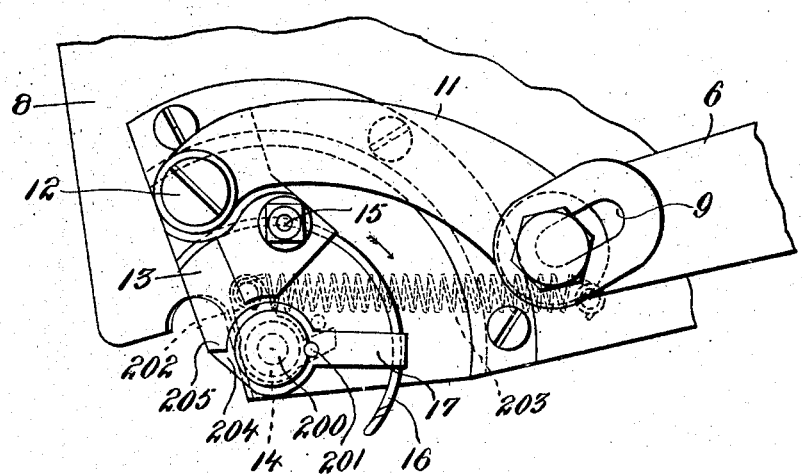
Figure 25:
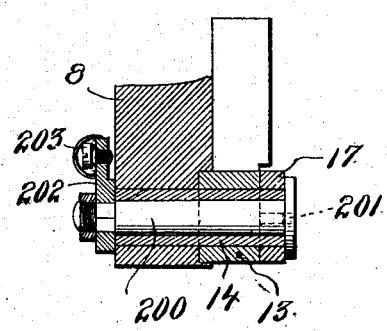
Figure 26:
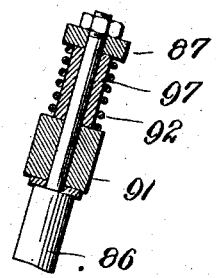

Referring to such drawings: Figure 1 is a front elevation of such machine; Fig. 2 is a vertical section from front to back, taken on the dotted line 2—2, Fig. 1, looking to the left; the wax-pot and its support being in elevation; Fig. 3 is a side elevation, on a larger scale, looking from the left of Fig. 1, but with one of the standards omitted, and with the main shaft in section; Figs. 4 and 5 are enlarged sectional details illustrating respectively in front and side elevation the awl motion and the feed motion, these figures also illustrating in part the welt guide and means for operating the same; Figs. 6 and 7 are details respectively in side elevation and front view, illustrating the novel stitch and substance support and actuating means therefor, Fig. 6 also showing the general location of the stitch tightening nippers; Figs. 8 to 11 inclusive are various details illustrating the construction and operation of the stitch tightening nippers; Fig. 12 is a sectional and diagrammatic view illustrating one method of forming and tightening a stitch by the machine herein shown when all its parts are employed; Fig. 13 is a detail illustrating a thread finger construction which is different from that shown in Figs. 1 to 7 inclusive; Figs. 14 to 16, details further illustrating the welt guide and the means for giving positive and permissive movement thereto; Fig. 17, a detail illustrating the preferred mounting of the stitch and substance support or device; Figs. 18 and 19, details respectively in side and rear end views, illustrating the means for locking and unlocking the back gage slide and the slide rest; Fig. 20 is an enlarged sectional detail showing the principal thread tension, together with the detail mounting of the take-up means; Fig. 21, a detail illustrating the connections for oscillating the awl; Figs. 22 and 23 are detail views of the looper mechanism; Figs. 24 and 25 are detail views illustrative of the needle-guide mechanism; Fig. 26 is a detail sectional view illustrative of parts coöperating with the shaft of the stitch and substance support.

In the particular embodiment of the invention selected for illustration herein and shown in the drawings, referring first to Fig. 1, the bed plate 1 adapted to be carried upon any suitable or desired column, has removably secured thereon the two end standards 2, respectively provided at their upper ends with alined bearings for the main shaft 3. Fast on this shaft (see Figs. 1 and 2) is a cam 4, having at its left side, Fig. 1, a side groove, which is not shown but which receives (see Fig. 2) a roller stud 5 on an arm of a needle actuating lever 6, fulcrumed at 7 in the rearwardly and upwardly extended arm of the center head 8 of the machine, which head is secured to or forms a part of the bed plate. The needle actuating lever 6 (see Fig. 2) is provided at its forward end with a slot 9 to receive adjustably the clamping bolt 10 to which is attached one end of the curved link 11. This link, at its opposite or front end, is jointed at 12 to the needle carrying block 13, fulcrumed upon a stud at 14, which stud is carried by a forwardly extended arm of said center head 8. The needle carrying block 13 is provided with a clamping screw 15 which, through the medium of a plate beneath it, furnishes means for securing to the said block the curved needle 16, provided with the usual hook or barb. By the means described rotation of the main shaft in the direction of the arrow, Fig. 2, causes rising and falling movement of the actuating lever 6 which, through the link 11, imparts an in and out oscillatory movement to the barbed end of the needle. This may be substantially as in machines at present manufactured. The needle guide 17, shown in detail in Figs. 29 and 30, is loosely mounted on the end of said stud 14 at the side of the needle carrying block. Said stud is made tubular to receive the shank of a shaft 200, the head of which overlies the needle guide and is secured thereto by a stud 201. The opposite end of said shaft 200 carries an arm 202, connected by a spring 203 with the center head 8 and whereby said spring acts through said shaft to turn the needle guide normally toward the work, from which it is periodically withdrawn at the proper times by a shoulder 204 thereon (Figs 6 and 29) which is engaged by an opposing shoulder 205 on the head of the needle carrying block at each retraction of the needle.

In machines of this type an awl is employed to penetrate, in part at least, the substance through which the needle is subsequently forced in the process of formation of a stitch, which awl is also given a lateral movement while in the work to assist in feeding the work from stitch to stitch. This awl mechanism is best shown in Figs. 4, 5 and 21. Referring to these figures, the awl carrying segment is indicated at 18, carrying the awl 19, the same being loosely journaled upon a stud 19$^a$ carried in the lower end of a depending arm 20 on the horizontal feed slide 21. This awl carrier has a segmental guide 18$^a$ which oscillates in a corresponding race way or bearing in said depending arm 20, which insures sufficient lateral support in addition to the pivot 19$^a$ to furnish the accuracy and permanency required. The feed slide 21 is mounted to slide horizontally in suitable bearings 22, provided therefor in a part of a second center head 23, of or secured to the bed plate, the two center heads 8 and 23 referred to and which are shown in Fig. 1 being substantially similar and parallel. This feed slide 21, which carries the awl, is given a lateral horizontal movement by means of a feed lever 24 (see Fig. 4) fulcrumed at 25 on the lower slide bearing, and is provided at its upper end with a roller stud 26, which travels in a path cam 27 (Fig. 1) formed in the cam 28 fast upon the main shaft. The feed lever 24 is slotted vertically to receive the stud 29, which is made vertically adjustable on the slide 21, to which it is attached, so that by adjusting the said stud vertically on its slide the movement imparted to the slide by a given oscillation of the feed lever may be varied as desired, to govern the length of feed imparted to the work by or from said slide. While as stated the awl 19, when in the work, has imparted to it a side movement of the awl carrying slide 21 as described, to assist in the feed of the work, the feeding action is also imparted to the work by a channel guide 30 (see Figs. 4 and 5) which is adjustably secured upon the face of the depending arm 20 of the feed slide. The action or thrust of the needle in entering the work usually causes the end of the channel guide to become embedded in the sole at the bottom of the channel and to disengage it to permit the channel guide to be returned after each feed for a new engagement and a new feed, said guide has heretofore been given an in and out engaging and freeing movement in addition to its transverse or feeding movement. In the machine here shown, however, the channel guide has only the transverse feeding movement, and its end is disengaged from the sole by giving to the needle a slight return or retrograde movement, after it has fully penetrated the sole and before the next feed. This has the effect of drawing the shoe and channel bottom away or off from the end of the channel guide.

To oscillate the awl about its axis 19$^a$ to cause it to enter the work just before the feed thereof, and to leave the work at the close of the feed and immediately in advance of the entering needle point, I have connected the awl carrying block 18 (see Fig. 21) by a link 31 with the end of an awl actuating lever 32. This lever (see Fig. 5) extends rearwardly through the machine and is journaled at the back thereof about the same axis 7 as the needle actuating lever 6 (Fig. 2), said awl actuating lever (see Fig. 5) having an upwardly extending arm 33, shown in dotted lines, which carries at its upper end a roller stud 34, which travels in a cam path 35, also shown in dotted lines Fig. 5, and formed in the left side of the feed cam 28, Fig. 1.

Since the awl and its carrier means have a side motion with the feed, while its actuating lever 32 conveniently can have no side motion, provision for such motion must be made in the connection between said lever and awl carrier. In machines of this type, as commonly made, a sliding connection has been employed between the link corresponding to the link 31 (Fig. 21) and the awl carrier but this construction has been found objectionable in many respects. To overcome these objections such link as herein shown is universally connected at its opposite ends with said lever 32 and said awl carrier 18 so that there may be free side movement of said carrier and its awl at the time of feed and return thereof without any sliding connection whatsoever, while permitting the lever at all times to impart desired oscillatory movement to said carrier and its awl. It is of advantage to cause the awl to be oscillated about an axis coincident with the axis of needle oscillation in order that the opposite penetration of the awl and the needle may be in the same arc or curved path and in connection therewith it is of decided advantage to have a positive oscillating connection, as 31, which will permit of the side movement of the awl so mounted without any sliding bearings, either pin blocks or gears.

As the awl withdraws from the work toward the operative the needle enters from the back, penetrates the work and presents its barbed end in front of the work to receive a bight or loop of thread to be drawn rearward by the needle through the work, in the process of forming the chain stitch. For laying the thread about and in the barb of the needle when so presented for its new bight or loop of thread, a looper is employed, which looper as herein constructed is shown at 36 (Figs. 1 and 2), it being in the form of a depending arm, secured at its upper end (see Figs. 1 and 2) upon the front end of a slightly oblique but nearly horizontal shaft 37, and to permit the position of this looper arm to be adjusted radially about and upon said shaft 37 said arm is slotted lengthwise between its ends and is provided next said shaft 37 with a clamp screw 38 (see Fig. 2) by means of which the split arm may be contracted about and upon said shaft to hold the looper securely in desired adjusted position. The manner of mounting and operating the looper shaft 37 is best shown by the details, Figs. 22 and 23. The looper has a motion to carry its eye or thread carrying end completely around the needle in order to lay the thread properly in the barb thereof and such motion or traverse is herein provided by oscillating and also longitudinally moving the looper shaft 37. Referring to the details Figs. 22 and 23, said shaft 37 is mounted to both oscillate and slide in a bearing 39, pivotally mounted at its side at 40 on the inner side face of the center head 8 of the machine. Said shaft 37 is made tubular and receives the shank of a screw bolt 41, having its head 42 overlying the outer end of said tubular shaft 37, and having its shouldered innner end screwed solidly to the head 43, which is forked to straddle the operating lever 44 to which it is pivoted at 45. Said operating lever is fulcrumed at its lower end at 46 on a stud carried by said center head 23 and at its upper end carries a roller stud 47 which travels in a cam path 48 in the side of the looper cam 49, Fig. 1, fast on the main shaft. Obviously, forward and back oscillation of the operating lever 44 will cause longitudinal movement of the looper carrying shaft 37. To oscillate said shaft simultaneously with said longitudinal movement, it has fast upon its inner end, next the head 43, a radially extended arm 50, carrying at its upper end a roller stud 51 (see Fig. 2) which travels in a cam path 52 in the peripheral face of said looper cam 49, Fig. 1. The lower end of said arm 50 is split in order that the arm may be adjusted freely and clamped in desired position upon said tubular shaft 37 by means of a clamping bolt 53, Fig. 2. Thus it will be seen that simultaneously with the longitudinal or in and out movement of the looper shaft 37 and its looper, said shaft and looper are oscillated sidewise by the radial arm 50 and cam path 52, the two movements being so combined as to produce the desired and necessary travel and traverse of the looper completely around the needle to lay a loop or bight of thread in the barb of the said needle, preparatory to the needle drawing said loop or bight rearward through the work. The shaft bearing 39 is mounted upon the side pivot 40 described, to permit it to oscillate slightly vertically as called for by the slightly curved path of endwise movement imparted to the shaft 37 by the oscillating lever 44 (see Fig. 2). This construction and mounting of the looper is superior to any known to me because of the complete elimination of joints in the means for imparting side movement thereto, which is the most important part of the looper movement and the reduction to a minimum of joints for imparting the in and out movement to said looper so that the looper, which is called upon to perform the most exacting and severe work, is calculated to retain for a maximum period its accuracy of adjustment and movement, there being little opportunity for wear or looseness. This guards against what is known as "mislooping" which is a difficulty frequently encountered with machines as at present constructed because of looseness which early develops in the joints of the looper mechanism, particularly as to that part of such mechanism which produces the side movement. The arms and connections are all short and compact so that there is little inertia and momentum to be cared for and little to cause undue and injurious wear.

I will now describe the nippers and the thread finger with the actuating means therefor which coöperate or assist in forming and tightening the stitch.

Referring to Fig. 12, the needle is shown at 16, the awl at 19, the channel guide at 30 and the looper at 36, all of which have been described. Also as described, the needle in the formation of the stitch will advance, penetrate the work, receive from the looper its bight or loop of thread and will withdraw to draw the said bight or loop rearward through the work and through the last previous loop to form a chain stitch. The tightness of the seam of course depends largely upon the extent to which the series of enchained loops are tightened and it becomes a great desideratum to effect this tightening with the least violence to the work embraced by the stitch and also to the thread itself.

In welting or inseaming boots and shoes, the insole is slitted obliquely downward and toward its outer edge to form a channel, such as indicated at $c$ Fig. 12, and is also formed to present a shoulder $c'$ against which the linings $e$, the upper $u$ and welt $w$ are drawn by the stitches which extend through from the bottom of the channel to the outer face of the welt, the portion of the insole between the bottom of the channel $c$ and the shoulder $c'$ being known as the "between substance" of the insole or sole. Since this between substance is the spongy interior of the sole, and, since manufacturers frequently use as low a grade of leather for insoles as is possible for the purpose of economizing in cost and also to obtain greater pliability of the shoe, this between substance is the first to give way in tightening the stitch and it has long been the aim of inventors so to tighten the chain stitch as to retain the required tightness of seam without cutting through this between substance. Formerly the stitches were tightened by the retracting movement of the needle, but this caused such a reeving and cutting action upon the between substance as to make it very objectionable. Later what is known as the "Briggs" method was devised, involving pulling upon the supply end of the thread to set the stitch while the last loop was still around the needle in the work, this method having been considered a great advance over the previous method involving the tightening of the stitch by the needle. The machine here shown proceeds upon still another and, as I believe, a superior line and tightens the stitch by seizing or clamping both limbs of the needle-loop, between the needle and the work, and carrying said loop along the work in the line of but opposite to the direction of the feed. Referring to Fig. 12, these nippers are shown at 54, 55, they being indicated in this figure as having seized and carried forward the needle loop to set the preceding stitch or stitches. Referring to Figs. 8 to 11, inclusive, the nipper 54 is shown as the downturned or hooked end of an arm extended inwardly and fulcrumed at 56 upon the back gage slide, to be hereinafter more fully described. This nipper is maintained normally in its extreme position at the right by a spring 58, shown best in Fig. 8. To permit of in and out adjustment of this nipper, its arm is formed in two parts, one of which is slotted lengthwise to receive the clamping bolts 59 (see Fig. 1). The coöperating nipper 55 is made as a resilient or spring arm, secured at 60 to the side of said back rest slide 108. When the nipper 54 is moved to the left (Fig. 8) it meets the coöperating nipper 55, pinching or clamping the thread, herein the strands of the needle loop, between them and, in its further movement to the left, carries the coöperating nipper 55 with it the arm of said latter nipper bending or flexing to permit of such further movement. During the return of the nipper 54 to its normal position at the right, said coöperating spring nipper 55 follows until it reaches the limit of its following movement by contact with the side of said back slide guide, whereupon continued return movement of the nipper 54 to the right causes it to leave and become separated from said nipper 55 as best shown in Fig. 8.

For operating the nipper 54 (see Fig. 8) I have provided the same near its outer end with a stud 61, which enters a slot 62 in the longitudinally adjustable end of an operating lever 61$^a$, fulcrumed at 62$^a$ and having its oppositely extended arm provided with a roller stud 63 which runs in a cam path 64, in the peripheral face of the take up cam 65, fast on the main shaft of the machine. Oscillation of this lever causes corresponding oscillation or lateral movement of the nipper 54 and, as described, coöperating oscillation of the nipper 55.

To vary the side movement of the nippers I have provided for adjustment of the position of the fulcrum 62$^a$ of the lever 61$^a$ (see Fig. 8). To this end the said lever is slotted at 66 (see Fig. 8) to receive a sleeve 67 (Fig. 11), mounted on a stud 68 carried by a bracket 69, fast on the center head 8 of the machine. The sleeve 67 at its lower end has a flange or head 70 and at its upper end is threaded to receive a nut 71. By slacking this nut the lever may be shifted relative to the fulcrum stud 68 to vary the relative lengths of its inner and outer arms of the lever and, therefore, the side movements imparted to the nippers. When so adjusted the lever is secured in position by tightening the nut 71, which secures the said lever firmly to the said sleeve 67, which latter at all times turns freely upon the stud 68. This in and out adjustment of the lever for varying its throw may occur without changing the previously adjusted position of the nippers because of the pin and slot connection 61, 62, with said nippers.

When the needle draws back its loop of thread, as indicated in Fig. 12, the nipper 54 is moved to the left and deflects the needle loop to the left, thereby so to speak, toggling said loop until said nipper 54 has progressed sufficiently to clamp the thread between itself and the coöperating nipper 55, after which the two nippers, holding the needle loop between them, have a further movement as described which may be simultaneous with the feed or any part thereof as desired, until at the proper moment and preferably before the feed has been completed, the nipper 54 is given its return movement back to normal position shown in dotted lines Fig. 12. During the first part of this return movement, the nipper 55 follows it, the resilience of its arm being sufficient to cause it, during such return movement to follow closely the nipper 54 and retain the seizure upon the needle loop so as to cause such loop to be drawn to the right in a direction opposite to the feed to carry along and straighten the toggle previously put into the needle loop. This straightening of the needle loop draws over or along the work the preceding loop and by drawing forward the loops enchained therewith at the same or needle side of the work causes the preceding loop or loops to be tightened upon the work. This produces a seam which is tighter than any seam of the character heretofore produced so far as known to me, and with less violence upon the between substance because the line of draft is in the direction in which the loops must be moved in tightening; and this is accomplished unaided by the needle or by any take-up or equivalent device. By the time the following or spring nipper 55 reaches the limit of its following movement the stitch has been completely tightened, and the nipper 54 thereafter returns alone to its normal position beyond the needle. When the nippers move to the left to toggle the needle loop preparatory to the return or stitch tightening movement thereof, a slack is created in the stitch last formed which if not taken care of would leave the last preceding loop lying loosely and slackly about the needle loop. To prevent this the machine here shown is provided with a thread finger 72 (Fig. 12) which, (see Figs. 2 and 6) is secured to the right hand end of a short shaft 73, fulcrumed in the central head 8 and extended through said head and provided at the opposite side thereof with an inwardly extended arm 74 (see Fig. 6). This arm 74 is connected by a link 75 with a lever 76 (Fig. 6) fulcrumed at 77 in said central head 8. This lever 76 is a bell crank; its vertical arm being shown in dotted lines (Fig. 3) and it is provided at its upper end with a roller stud that travels in a cam groove 78 at the inner face of the take-up cam 65 referred to. When the looper moves to lay a loop of thread in the barb of the needle, this thread finger stands in its inmost position next the between substance (as shown in dotted lines, Fig. 12) so that the thread is carried by the looper outside of and above this thread finger, leaving the latter, so to speak, within or behind the thread leading from the work to the needle. After the stitch has been formed and the needle loop toggled over as described this thread finger is given an outward movement to the position full lines, Fig. 12, to pull through the slack in the next preceding loop, causing the latter to be shortened so as to follow the toggling or deflection of the needle loop so as to always lie close about said needle loop. The thread finger then retracts or returns to its original position (shown in dotted lines, Fig. 12) giving up the thread which it had drawn through and permitting such thread to be drawn back through the work by the further retractive movement of the needle and before the nippers have moved to tighten the stitch. Thus substantially all slackness or looseness has been removed from the last formed stitch before the nippers move (Fig. 12) to tighten the stitch as described.

If desired and necessary to cause the thread finger to retain its hold upon or position within the loop formed by the traverse of the looper to and about the needle, said thread finger may have a preliminary outward movement until the new loop has been placed in the barb of the needle, when it may be returned to its original dotted position (Fig. 12) with the beginning of the retractive movement of the needle, said thread finger being given its second or slack taking movement at the proper time as described, and the machine here shown is organized to provide this preliminary thread holding movement in addition to the slack taking movement.

In Fig. 13 I have shown a modified construction of thread finger mechanism. In this modified construction the thread finger is marked 79, the same being formed upon the lower end of an upwardly inclined short shaft 80, journaled in one of the center heads 8 of the machine. This short shaft at its upper end has a laterally extended arm 81 connected by a link 82 with a cam actuated lever arm or its equivalent 76 or other means for reciprocating it.

Referring to Fig. 12, the point at which the between substance of the sole would be most likely to be cut away in the tightening of the stitch is at the corner where the single thread turns from the bottom of the channel to pass through as one leg of the new needle loop. To protect this corner I employ a stitch and substance support or device or work-protector 83 shown as an awl like point (see Fig. 17) depending from a horizontal shank 84, mounted to slide freely lengthwise in a socket 85 provided therefor in the lower end of an upright shaft 86 loosely mounted in said center head 8. The horizontal shank 84 of this support or work-protector is made tubular to receive a spring 87, which is seated at one end in the bottom of the tubular shank and at its opposite end against a screw stud 88, carried in the bearing 85 and extended through a slot 89 in the wall of said shank. This spring tends to keep said protector 83 normally and yieldingly extended to its extreme position at the right (Fig. 17), that is, next the needle and awl of the machine movement in this direction being limited by the end of the slot 89. To prevent rotation of the shank of the stitch and substance support or work-protector in its bearing 85 the said shank is provided with a screw stud 90 which travels in a slot or way provided therefor in said bearing 85. Thus said supporting point or protector has a yielding movement in the bottom of the shaft 86 in the general direction of work feed and an in and out or front to back oscillatory movement with said shaft 86 about the axis of the latter. At its upper end the shaft 86 (see Fig. 6) is provided with a fast collar 87, between which and a block 91 seated on a shoulder of the said shaft and encircling the latter is an interposed coiled spring 92, which yields to permit rotation of the shaft with its work-protector but when said device is free returns its shaft and device always to normal position, determined by contact of the side of the bearing 85 with the center head 8. To reciprocate said shaft 86 vertically to cause its said work-protector 83 to meet or penetrate the work during the process of forming and tightening a stitch and to again leave the work preparatory to repositioning for the next stitch, I have connected said block 91 (Fig. 6) by a link 93 with the forward end of the horizontal arm of a bell crank lever 94, fulcrumed at 77 on said head 8 and having its upwardly extended arm (see Fig. 3) provided with a roller stud 95 that travels in a cam path 96 on the left or outer face of the cam 65 (Fig. 1). Between the block 91 (see Figs. 6, 7 and 26) and said collar 87 and within the spring 92, the reduced end of said shaft 86 is surrounded by a thimble or sleeve 97 so that said block 91 is held rigidly between a shoulder on said shaft at its under side and said thimble or sleeve at its upper side being thereby rigidly secured to said shaft so far as endwise movement of the latter is concerned but permitting perfectly free rotative or oscillatory movement of the shaft within it under the action of the work tending to turn it in one direction and the spring 92 tending to return it in the opposite direction. As here organized, just as the looper completes its movement to lay a new bight or loop of thread around and in the barb of the needle, the work-protector 83 is depressed to cause its pointed or awl shaped end to enter behind the thread leading from the work to the needle. Should the channel lip be turned back sufficiently the protector will enter the channel behind the thread therein and preferably enter, more or less, the sole at the bottom of the channel, but should said channel lip be not turned back sufficiently said protector will penetrate the channel flap or the between substance in order to reach its position behind or inside of the thread leading to the needle. In either case, when it reaches its lowermost position on or in the sole Fig. 12 it furnishes a corner or turning device about which the thread is drawn or tensioned in the tightening of the stitch and which not only prevents any objectionable or detrimental cutting of the between substance adjacent thereto but facilitates the tightening of the stitch by furnishing a constant and uniform bearing point thereat about which the thread may be drawn. The work-protector 83 moves downward to engage or penetrate the work while the needle is in the work, so that the needle serves as a support for the work in opposition to the thrust of said work protector. The work is fed while this work protector is in or on it, and to permit of such feed without restraint by this device the latter is free to travel with the work in any direction in which the latter may be moved, the rotative movement of the shaft 86, at the bottom of which said protector is mounted, contributing to this end, the device in every instance springing back to its normal position preparatory to insertion in a new stitch as soon as it has been withdrawn upon completion of the tightening of the preceding stitch.

Referring now to Figs. 4, 5 and 18, 19, my machine is provided below the stitch forming devices with the slide rest 98, which, so far as its shape and location are concerned, may be similar to existing machines but which as to its manner of mounting and control presents features of novelty. Referring to Fig. 5, said slide rest is formed at the outer end of a horizontal slide 99, mounted in integral dovetail ways in the inner face of the center head 8. This rest is retained normally and yieldingly in its extreme front position by a spring 100 (see Fig. 18) connecting a stud 101 on the head 8 with a stud 102 on the slide. At its upper edge and rear end said slide is provided with a series of ratchet teeth 103, facing rearward and coöperating with a pair of differentially located pawls 104, fulcrumed at 105 in an ear of the said head 8 and provided respectively with upturned toes 106.

Immediately above the slide rest 98 (see Figs. 2, 4 and 5) is the back gage 107 shown as arranged wholly at one side of the needle and awl and upon the front end of a rearwardly and upwardly inclined slide 108 (see Fig. 18), mounted to slide also in integral dovetail guides in the inner face of said center head 8 and likewise held yieldingly in its forward position by a spring 109, attached at one end to a stud 110 on said head and at its opposite end to a stud 111 on the rear end of said slide. This back gage slide at its under edge is provided also with a series of rearwardly facing ratchet teeth 112, coöperating with which are two pawls 113, fulcrumed at 114 on said head and provided with depending toes 115. The opposite pawls of the two pairs are shown as provided with arms 116, joined by springs 117 which serve to maintain both sets of pawls in yielding engagement with their respective ratchets. Opposed to and in front of the adjacent ends of the toes 106, 115, is a block 118 on the lower end of the depending arm of the bell crank 119, fulcrumed at 120 on said head and provided at the forward end of its horizontal arm with a roller stud 121 that travels in contact with a peripheral cam 122 on and as a part of the looper cam 49 (see Fig. 1). Said bell crank is held in position with its roller in contact with said cam (see Fig. 18) by a spring 123, shown only in dotted lines. Referring still to Fig. 18, the slide 108 of the back gage is adapted to be withdrawn positively when freed from its pawls by the depending arm 124 of a lever fulcrumed at 125 in said center head 8 and having its opposite arm provided with a cam roller 126 (see Fig. 1) adapted to travel in a cam path in the left hand side face of the looper cam 49. These cams are so timed relative to the other parts of the machine that just before the work feed occurs the bell crank lever 119 will be moved to cause its block 118 to contact with the toes 106, 115, of the pawls and withdraw both sets of pawls from engagement with their respective ratchets, leaving both slide bars free. The lever 124 is immediately moved to withdraw the slide 108 of the back gage to remove it from the work until the feed has been completed or substantially so, while the slide bar 99, likewise free, is pushed rearwardly against the action of its spring 100 by the work, as the latter is fed past the machine or, if the contour of the work permits, said slide 99 will be drawn by its spring forward during the feed, after which the lever 124 is returned to permit the back gage slide 108 to advance under the action of its spring 109 until its back gage contacts with the work. That is to say, during the period of feed both the slide rest and the back gage are released from their pawls and the former is positively withdrawn while the latter is left free to follow the changing contour of the work during the period of feed, after which said back gage is released and permitted to be drawn by its spring again forward until it meets the work so that at the close of the feed both the slide rest and the back gage are in contact with the work in its new position, in which position they are immediately locked by release of their respective pawls 104, 113. This locking of the two slides furnishes the required support for the work during the period of withdrawal of the needle in pulling back its new loop. The connection between the lower end of the lever 124 and the back gage slide 108 is such, as for instance forked as shown, that when the back gage has contacted with the work the lever may complete its movement, if not already completed. This gives always a yielding contact of the gage with the work.

The construction illustrated and described is compact, the action of the various parts is direct, the springs are ample to give a uniformly yielding movement or resistance and there are no rotating wheels or parts to set up an inertia or momentum to interfere with the prompt and sensitive action of the parts.

Referring now to Figs. 4, 5 and 14 to 16, inclusive, I will describe the welt guide construction, where the welt guide is to be used. As previously stated, the channel feed guide 30 (see Fig. 5) is mounted on the depending arm 20 of the feed slide, said arm also carrying the awl carrier stud 19$^a$. Referring to Fig. 16, this stud 19$^a$ has an eccentrically located bore or internal bearing for a stud 127, which stud at its inner end (at the left Fig. 15) has a depending arm 128, the lower end of which is formed to provide a suitable welt guide 129, which stands as shown best in Figs. 5, 14 and 15 obliquely to and in the direction of feed of the work so as to lead the welt conducted therethrough naturally and easily to the work to be stitched thereto by the stitch forming mechanism. This welt guide must, of course, have a perfectly free in and out movement to follow freely the changing contour of the side of the work and this is here provided by permitting it to oscillate freely about its stub 127. While this radial or swinging movement is best adapted to follow the changing contour of the work fed past it, better in fact than the sliding welt guides commonly employed, it should nevertheless be positively withdrawn from the work during the period of work feed, to prevent it exerting a detrimental drag on the work or shoe upper to full or wrinkle the latter during the work feed, after which it should be again permitted to move yieldingly forward into contact with the work in the new position of the latter. In the present instance of my invention I accomplish this by mounting upon the side of the back gage slide 108 a bell crank lever 130, fulcrumed at 131 upon said slide 108 and having its depending forked end embracing a fixed stud 132 on the center head 23 of the machine. The horizontal arm of said bell crank is likewise forked to embrace a stud 123 on the arm 128 that carries the welt guide, so that as said slide 108 is moved rearward to withdraw the back gage from the work it will take with it the fulcrum 131 of the bell crank lever, the stud 132 serving as a stationary fulcrum point to lift the forked end of the horizontal arm of said lever, thereby to lift positively the welt guide and cause the latter to swing about its own center away from the work. When the back gage slide 108 is permitted again to spring forward to meet the work it will carry forward with it the bell crank fulcrum 131, causing the free end of its horizontal arm again to depress the arm of the welt guide to cause the latter to swing once more into contact with the work in the new position of the latter.

While it is important that the withdrawal of the welt guide should be positive and ample, there is no positively determinable position to which it may be moved toward the work; that is to say, its movement toward the work should be variable to enable it to accommodate itself to the varying thicknesses of material. I provide for this in the present arrangement by making the upper arm of the fork at 133 as a yielding or spring member, secured to the horizontal arm of the bell crank so that should the welt guide meet the work before the slide has completed its forward movement said spring arm will yield to permit the welt guide there to rest while still permitting continued movement of the back gage slide to bring the back gage into its contact with the work. As heretofore stated, the back gage is positively withdrawn after each stitch and is then permitted yieldingly to advance until it meets the shoe, where it is locked in order to support the shoe against the action of the retracting or withdrawing needle. In machines heretofore constructed, as far as known to me, this advance movement of the back gage which, as a rule, should occur before the needle in its advance meets the welt or the shoe, has always been by a single continuous movement and, by reason of the stroke it has, together with the fact that it is spring actuated, causes it to strike the welt lying against the shoe with an impact sufficient frequently to displace the shoe in the operative's hands and from the channel or feed guide, making it difficult to perform the best work on the machine. It is desirable that this back gage advance sufficiently to cause any loose portion of the upper, together with the welt, to be pressed into approximate position before the needle enters, but it is not necessary that said back gage advance to its full forward position until after the needle has entered the work and before it begins its retractive movement. I have, accordingly, in the machine here shown provided a two step advance movement for the back gage, the cam being shaped to give to the same first an advance movement into approximate position near to but not into its final forward position, but sufficient to insure the proper positioning of the upper and welt in front of the advancing needle where it rests and then, after the needle has entered the work and before it begins its retractive movement, said back gage is given its advance movement into full forward position in contact with the work where it is locked so as to support the shoe firmly in position against the retractive movement of the needle. The same movements are, of course, imparted in a measure at least to the welt guide, being modified usually during its second step movement by contact of the welt guide with the work before the back gage reaches its full forward position.

By suspending the welt guide from the feed slide and giving it a movement with the feed slide, said welt guide serves thereby as a welt feeding device, and this welt feeding guide is here positively withdrawn during the period of work feed by connecting it with the back gage slide.

To adjust the welt guide vertically its eccentric fulcrum stud $19^a$ may be rotated more or less thereby to change the location of the welt support 127 contained therein. This adjustment may occur without any effect upon the awl carrier. Said stud $19^a$ is held in adjusted position (see Fig. 16) by a set screw 134. When said screw is released the stud itself may be rotated conveniently (see Figs. 14 and 15) by means of a knurled or peripherally toothed head 135, provided upon and at the end of said stud.

It will be noticed that the back gage 107 and the welt guide 129 are herein separate and distinct, both having a positive withdrawal, one in a right line and the other in an arc, they having independent yielding return movements toward the work, the welt guide having also a feeding or side movement toward and from the back gage permitted by sliding of its pin 123 (Fig. 14) in the fork of the bell crank lever.

I will take up next the thread tension and take-up or thread controlling means. The thread drawn from a wax pot, which may be of usual or desired construction, is led to and over a tension wheel 149 (see Fig. 20 and Fig. 2) loosely journaled on a stud 150, fast in a bracket 151, secured by screws or otherwise to the center head 8. Between the bracket and head, and secured by the same clamping means as the bracket, is a cup 152 which prevents any wax dropping from the tension wheel or the thread thereon upon the parts, particularly the take-up arms located beneath. The tension wheel is provided with oppositely extended flanged hubs 153, the faces of which are acted upon by friction washers 154 located at one side between the wheel flange and a collar 155 loosely mounted on the wheel stud and pressed yieldingly toward the wheel to act thereon and to press the wheel also toward the supporting bracket by means of a spring 156, encircling said stud and held in adjusted tension by a nut 157 screwed upon the end of said stud. By this construction ample friction faces are provided for the control of the wheel and at opposite sides the latter, giving a perfect balance, and said surfaces are removed from any possible interference by wax from the thread encircling said wheel. In the machine described employing the nippers 54, 55, for tightening the stitches a take-up independent thereof would not under all conditions be necessary or desired. Conditions might arise, however, where it would be found that the retractive movement of the needle 16 would not be sufficient conveniently or satisfactorily to draw through all of the slack at the single thread side of the seam produced by the slack taking action of the thread finger 72 and, under such conditions, it would be desirable to employ a take-up to pull through a sufficient portion of the slack to enable the needle in its retractive movement to take up the rest. I have accordingly, in the machine here disclosed illustrated a take-up which may be used for this purpose but which when desired, may be clamped or secured to render it inoperative so as to serve merely as a guide over which the thread may be conducted from the tension wheel in order to render operative the usual auxiliary take-up which it is always desirable to employ for the purpose of taking care of any slackness in the thread between the tension wheel and the work. In the portion of the head 8 which supports said bracket and directly beneath the latter is loosely journaled the hub 158 of the positive or main take-up lever 159, one of the arms of which (see Fig. 3, also dotted lines Fig. 2) is extended rearward and is connected by a link 160 with the end of an actuator lever 161, fulcrumed at the rear upon the stud 7 described. This lever is provided intermediate its ends with a roller stud 162 that runs in a cam path 163 in the take-up cam 65 on the main shaft and previously referred to.

The rearwardly extended arm 159 of the take-up lever is located at the left of the center head 8 (see Fig. 20) and is keyed upon its adjacent end of the lever hub 159, the opposite or forwardly extended arm of said lever being located at the opposite side of said head 8 and integral with said hub. This forwardly extended arm of the take-up lever (see Fig. 2) reaches out at the front of the machine and carries a usual thread truck 164 at its outer end, over which the thread may be carried and extend in a direct line, downward through the looper to the stitch forming point. This main take-up is so timed that it will pull through in a direction opposite to the retractive movement of the needle a certain amount, more or less, of the slack thread in the last stitch formed and before the needle in its retractive movement takes up the balance of the slack. This pulling through of the thread by the take-up will produce a reeving thereof in the barb of the needle and through the next preceding loop, but this reeving is unobjectionable because the thread is not under tightening tension at the time. When it is desired to cut out this take-up action and rely solely upon the retraction of the needle to take care of the slackness produced by the movement of the thread finger 72, its actuator lever 161 (see Fig. 3) is disengaged from the link 160 and removed and a pin inserted through the disengaged end of the link into a properly placed hole in the head 8, thereby to lock the take-up lever in position to cause it to serve merely as a guide for the thread.

Between the main take-up 159 and the thread tension (see Fig. 2) is arranged the auxiliary take-up lever 165. This lever (see Fig. 20) is fulcrumed upon a short shaft 166 that extends axially through the hub 158 of the main take-up lever 159 and is journaled in the latter. This short shaft 166 at its outer or left hand end (Fig. 20) is squared as shown to receive a head 167 clamped thereon by a nut 168. This head is provided with an inwardly extended pin 169, adapted to enter one of a circular series of holes 170 in a collar 171 loosely mounted on said shaft. This collar receives one end of a coiled spring 172, which encircles said shaft and, at its opposite end, engages the adjacent end of the hub 158 of the main take-up lever. The collar 171 is cupped so as to inclose the head 167 and furnishes a convenient surface for engagement by the fingers of the operative and, by pushing said collar axially inward to disengage it from the pin 169 said collar may be turned more or less in either direction to vary the tension of the spring 172 as desired and then the collar may be again pressed by said spring upon said pin in the nearest hole to retain the collar and spring in adjusted position. Thus the auxiliary take-up lever 165 is spring controlled and its tension may be readily and conveniently adjusted without the use of tools and retained in adjusted position without attention from the operative. The spring actuated movement of the auxiliary take-up is limited, when not controlled by the thread, by a stop pin 173 carried by the head 8 and standing between two stop ears on the auxiliary lever. At its free end said auxiliary take-up lever carries a thread truck 174, which is located between the main take-up truck and the tension in such position as to produce a proper angle in the thread passed under the same, and is thereby in position always to take care of any slack that is present in the thread between the tension and the work and due to the formation of a stitch.

Mounted upon the machine (see Fig. 2) and in position above and at the rear thereof, is a wax pot 175, adapted to receive the wax in lump form to be melted for impregnating or waxing the thread. This wax pot is shown supported upon the rear ends of both center heads 8 and 23.

It is desirable to maintain the working parts of the machine which are in contact with the wax thread, always in a warm or heated condition. This is conveniently accomplished by heating the head 8, thereafter to heat by radiation the adjacent working and thread manipulating parts. In the present instance, see Fig. 3. To this end, the principal working or thread handling parts are concentrated on said head 8, leaving the other parts mounted upon the adjacent head 23, free from the heating effect which is detrimental where not absolutely required. Referring to Fig. 3, said head 8 as shown by dotted lines, is provided with two vertical heating passages 225—226 connected by a horizontal or cross passage 227 and heating medium for example, steam, is caused to circulate as indicated by the arrows, in and through these passages. In furtherance of this same general idea, I prefer to make the entire machine head in separable sections or parts, to facilitate access to and removal of said parts. For example, referring to Fig. 1, either of the end standards may be removed at will from the bed plate 1, to which they are secured, thus exposing either end of the main shaft as desired for removal of the cams or any of them thereat.

As heretofore stated, the principal working parts of the stitch forming and feeding mechanisms are mounted upon the central heads 8 and 23, one of which as stated, carries the working parts to be heated and the other the working parts that require no heating. To enable these parts to be reached conveniently for any of the purposes required in practice, I prefer to form said heads 8 and 23 as separate and separable members and they are so shown herein, they being independently secured to the bed plate 1. Thus either head may be removed, together with the working parts mounted thereon, either to permit convenient adjustment of or work upon said parts or to give access to the parts upon the adjacent head that is not removed. When in working position, the said heads are steadied and supported one by the other by the shaft 7 Fig. 2, upon which either of the operating levers are fulcrumed and which extends from one to the other of said heads, also, if desired, by additional means. For example, the connecting strut or stud 7$^x$ Fig. 2 passed therethrough. Both the shaft 7 and the stud 7$^x$ may and preferably will be passed loosely through one of the heads and screwed into the other with an interposed sufficient sleeve between the heads and surrounding said screw.

The operation of the machine in the various parts will have been made sufficiently clear from the foregoing description of the various parts and no résumé thereof is deemed necessary at this point.

I claim:—

1. In a sewing machine, the combination with stitch-forming and feeding mechanisms, of a work protector around which the needle-thread is laid on one side of the work, said work protector being yieldingly mounted so as to be free to be moved with the work as the latter is fed, and means for operating said work protector to cause it to engage the work, at intervals, so as to be moved thereby in the direction of the seam being formed, as the work is fed, and means for causing said protector to be disengaged from the work and to be returned to its first position.

2. In a sewing machine, the combination with stitch-forming and feeding mechanisms, of a work-protector around which the needle-thread is laid on one side of the work, a loosely mounted upright shaft having a horizontally extending socket at its lower end, a shank yieldingly mounted in said socket and by which shank said protector is carried, and means for operating said shaft.

3. In a sewing machine, the combination with stitch-forming and feeding mechanisms, of a work-protector around which the needle thread is laid on one side of the work, an upright shaft which is yieldingly mounted torsionally, and which is provided with a socket at its lower end, a horizontal shank by which said work protector is carried and which shank is yieldingly mounted so as to be adapted to slide in such socket, and means for operating said shaft.

4. In a sewing machine, the combination with stitch-forming and feeding mechanisms, comprising a needle, of a work-protector, means for moving said work protector toward and from the work to engage and be disengaged therefrom, said needle being so timed in its operation as to furnish a support for the work in opposition to the thrust of said work protector.

5. In a sewing machine, the combination with stitch-forming devices, of a work-protector around which the needle thread is laid and which is so mounted as to slide along and rotate about the same axis, said work protector being also mounted so as to be movable transverse to said axis.

6. In a sewing machine, the combination with stitch-forming mechanism, of a work protector mounted to slide along and rotate about the same axis, and having also a spring-controlled movement transverse to said axis.

7. In a sewing machine, the combination with stitch-forming mechanism, of a work protector mounted to slide and rotate about the same axis, and yielding means for controlling the rotary movement of said work protector about said axis.

8. In a sewing machine, the combination with stitch-forming mechanism, of a work-protector having a laterally movable, spring-controlled shank, a socket in which said shank may slide, a shaft by which said socket is carried, a bearing in which said shaft may rotate and slide, a spring controlling the rotary movement of said shaft, and means, operable from the main shaft of the machine, for reciprocating said shaft and protector.

9. A chain-stitch sewing machine comprising stitch-forming mechanism including clamping means to seize both limbs of the last formed needle thread loop and carry said loop to one side substantially in the line of feed.

10. A chain-stitch sewing machine comprising stitch-forming mechanism including clamping means to seize both limbs of the last formed needle-loop between the needle and the work and carry said loop to one side substantially in the line of feed.

11. A chain stitch sewing machine comprising stitch-forming mechanism including clamping means to seize both limbs of the last formed needle loop between the next preceding loop and the needle and carry said loop to one side substantially in the line of feed.

12. A sewing machine comprising stitch-forming mechanism including clamping means to seize both limbs of a loop and shift the position of the loop end of the last preceding loop in the direction of the feed, to furnish opportunity to draw it in an opposite direction, and means to draw it in such opposite direction.

13. A chain stitch sewing machine, comprising in combination, a curved needle, a curved awl of the same radius as the needle, a feeding channel guide, means to move the same in the line of feed, and means to give to the needle a channel guide clearing movement to disengage the work from said guide and permit return movement of the latter.

14. A sewing machine containing in combination the following instrumentalities; means, including a needle, to form a series of enchained loops, clamping means for seizing the needle-thread on the double thread side of the work, and means at the single thread side of the work operating in a formed stitch, to shorten a loop at the opposite or double thread side of the work.

15. A sewing machine containing in combination the following instrumentalities; means, including a needle, for producing a series of enchained loops, clamping means for seizing the needle thread on the double thread side of the work, and means at the single thread side of the work, operating in the last formed stitch, to shorten, at the opposite or double thread side of the work, the loop next preceding the needle-loop.

16. A sewing machine containing, in combination, the following instrumentalities: stitch-forming mechanism for forming a series of enchained loops and comprising means for shortening the loop next preceding the needle loop to a length less than the final stitch length, and clamping means, at the loop-side of the work, to seize both limbs of the needle-loop and draw said shortened loop along in a direction opposite the feed to tighten the stitches.

17. A sewing machine containing, in combination, the following instrumentalities, stitch-forming mechanism for forming a series of enchained loops and comprising means for shortening the loop next preceding the needle-loop to a length less than the final stitch length, work-protecting means at the single thread side of the work, and clamping means at the loop-side of the work to act on a doubled thread and carry along the shortened loop to tighten the stitches.

18. A sewing machine containing in combination the following instrumentalities, stitch-forming mechanism to form a series of enchained loops, means to shorten the loop next preceding the needle-thread loop, means for drawing the slack thread resulting from said preceding loop, means thereafter to move said shortened loop to tighten the stitches, and means, at the single thread side of the work and standing between the single thread of the last-formed stitch and the work, to receive the stitch-tightening pull thereat.

19. A sewing machine comprising stitch-forming mechanism, combined with loop-deflecting and loop-seizing means at the needle side of the work, and slack-removing means at the opposite side of the work.

20. A chain-stitch sewing machine containing stitch-forming mechanism, combined with stitch-tightening nippers to engage both strands of the last formed needle loop one of the members of which serves also as a loop-deflector, and means to operate said nippers.

21. A chain-stitch sewing machine comprising stitch forming mechanism, combined with loop-deflecting and stitch-tightening means to engage both strands of the last formed needle loop, and means to impart positive loop-deflecting movement and yielding stitch-tightening movement thereto.

22. A sewing machine comprising stitch-forming mechanism, combined with nippers one member of which has a movement from one to the opposite side the line of the needle loop extending from the work to the needle, when the latter is retracted, and the other member of which stands always at one side of the line of the needle loop, and means to move both said nippers first in one and then in an opposite direction.

23. A sewing machine comprising stitch-forming mechanism, combined with nippers one member of which has a movement from one to the opposite side of the line of the needle loop extending from the work to the needle, when the latter is retracted, and the other member of which stands always at one side said needle loop, and means to move both members of said nippers first in one and then in an opposite direction.

24. A sewing machine comprising stitch-forming mechanism, combined with stitch-tightening nipper members one of which is pivotally supported and the other spring-supported, and means to move the latter by the former, said nippers being arranged to operate on the needle loops between the needle and the work.

25. In a sewing machine, the combination with stitch-forming mechanism comprising a needle, of a looper, an arm by which said looper is carried, a sleeve to which said arm is rigidly secured, a bearing in the machine frame in which said sleeve is mounted so as to reciprocate endwise and oscillate, a rod passing through said sleeve, a forked head in which said rod is screwed, an operating lever to which said head is pivoted, a second arm attached to said sleeve and by which the latter is oscillated, and positive means for operating said second arm and said lever for the purpose of imparting positive oscillating and endwise reciprocating movements in both directions to said sleeve.

26. In a sewing machine, the combination with a needle, of a looper coöperating therewith, a sleeve having a plurality of arms rigidly attached thereto and by one of which said looper is carried, means for positively operating said arms in opposite directions, a rod extending through said sleeve and about which the latter is oscillated and on which rod said sleeve is mounted so as to be restrained from endwise movement relative thereto, a head into which said rod is screwed, an operating lever to which said head is pivoted or joined, and means for vibrating said lever to impart endwise movement to the said rod and sleeve.

27. A sewing machine containing stitch-forming mechanism comprising a curved needle and a curved awl, combined with a feed-slide, means to operate it, means connecting said feed-slide with said awl to impart lateral or feeding movements thereto, a feeding channel guide connected with and having the movements of said feed-slide in the line of the feed only, and means to cause the needle to disengage the work from the channel guide after each feeding movement.

28. A sewing machine containing stitch-forming mechanism comprising, in combination, a curved needle, a curved awl, a feeding channel guide, means to move the same in the line of feed only, and means to give to said needle a channel-guide clearing-movement, to disengage the work from said guide, to permit the return movements of the latter clear of the work.

29. A sewing machine containing stitch-forming mechanism comprising a needle, means to give it a plural step, retractive movement, an awl, means to move the same in the direction of feed, and a feeding channel guide having a movement in the line of feed only, one step of the plural step retractive movement of the needle serving to clear the work from said channel guide after a feeding movement.

30. A sewing machine containing stitch-forming mechanism including a curved needle, combined with a rearwardly movable back gage, a back-gage slide, and an oscillatory welt guide yieldingly connected with said slide so that the latter may continue to move forward after the forward movement of the welt guide has been arrested.

31. A sewing machine containing stitch-forming mechanism including a curved needle, combined with a back gage slide, and an oscillatory welt guide yieldingly connected with said slide and rocked thereby, said connection permitting forward movement of said slide independently of said oscillatory welt guide.

32. A sewing machine containing stitch-forming mechanism including a curved needle, combined with an oscillatory welt guide, a pivotal support therefor, and means to adjust said pivotal support toward and from the work to vary the position of the welt guide relative to the work.

33. A sewing machine containing stitch-forming mechanism including a curved needle, combined with an oscillatory welt guide and adjustable eccentric means supporting the same at its axis of rotation.

34. A sewing machine containing stitch-forming mechanism including a curved needle, its awl and looper, combined with a rearwardly movable back gage, a rearwardly movable slide rest, and an oscillatory welt guide swinging on a pivot and connected with one of said rearwardly movable members to be moved by the latter.

35. A sewing machine containing stitch forming mechanism including a curved needle, its awl and looper, combined with a rearwardly movable slide rest, a rearwardly movable back-gage, and an oscillatory welt guide swinging on a pivot and connected with said back gage to be moved by the latter.

36. A sewing machine containing stitch forming mechanism including a curved needle, its awl and looper, combined with a rearwardly movable slide rest, a rearwardly movable back gage, a pivotally mounted oscillatory welt guide connected with said back gage to be moved by the latter, and locking means for said back gage and slide rest.

37. A sewing machine containing stitch-forming mechanism including a curved needle, its awl and looper, combined with a rearwardly movable slide rest, a rearwardly movable back gage, a pivotally mounted oscillatory welt guide connected with said back-gage to be moved by the latter, locking means for said back gage and slide rest, the connection between said back gage and oscillatory welt guide being yielding to permit of variable position of the welt guide relative to any locked position of said back gage.

38. A sewing machine containing stitch-forming mechanism including a curved needle, combined with a pivotally mounted oscillatory welt guide, a back gage, means to move it toward and from the work, and connections between the back gage and oscillatory welt guide to oscillate the latter by movement of the former.

39. A sewing machine containing stitch forming mechanism including a curved needle, combined with a welt-feeding pivotally-mounted oscillatory welt guide, a rearwardly movable back gage connected with and to oscillate said welt guide, a rearwardly movable slide rest, and locking means for said back gage and slide rest.

40. A sewing machine containing stitch forming mechanism including a curved needle and means to give it a plural step retractive movement, combined with a feed slide, the awl connected therewith, and a channel feed guide mounted thereon, an oscillatory welt guide also movable with said feed slide, a back gage connected with and serving to oscillate said welt guide, and a slide rest.

41. A sewing machine containing, in combination, a needle and awl, operating means therefor, a pivotally mounted welt guide, a back gage and its slide, a lever 130 pivotally connected to the back gage slide, and yielding connections between the lever 130 and the welt guide to oscillate said welt guide.

42. A wax thread sewing machine containing stitch forming mechanism, thread waxing means, a waxed thread tension device, a cup below the same and covering operative parts of a stitch-forming mechanism, and common means for supporting said tension device and said cup.

43. A sewing machine containing stitch-forming mechanism comprising an oscillatory needle and its actuator, an oscillatory awl having a common axis with said needle, awl-actuating means, and a feed slide carrying said awl, combined with an oscillatory welt guide, a back gage, and means connecting the back gage and oscillatory welt guide for oscillating the latter from the back gage.

44. A sewing machine containing stitch-forming mechanism comprising an oscillatory needle and its actuator, an oscillatory awl having a common axis with said needle, awl actuating means, a feed slide carrying said awl, combined with an oscillatory welt guide having also a common axis of oscillation with said awl and needle, a back gage, and means disposed between the back gage and welt guide for oscillating the latter by movement of the former.

45. A sewing machine containing stitch-forming mechanism comprising an oscillatory needle, a feed slide, an oscillatory awl carried thereby, a back gage and its operating means, an oscillating welt feeding guide, said welt-guide, awl and needle having a common axis of oscillation and means to oscillate the welt guide from the back gage.

46. A sewing machine containing stitch-forming mechanism comprising an oscillatory needle, combined with a feed slide, an oscillatory awl carried thereby and having a common axis of oscillation with said needle, and a non-oscillatory feeding channel guide mounted on and movable with said feed slide.

47. A sewing machine containing a curved oscillatory needle and actuating means therefor, combined with a curved oscillatory awl, its carrier, a feeding member carrying said awl carrier, an awl actuator so connected with said awl carrier as to permit the latter to oscillate and to move with said feeding member, a feeding channel guide also carried by said feeding member, said awl actuator engaging said awl carrier between the awl and the said feeding channel guide.

48. A sewing machine containing stitch forming mechanism and feed mechanism, combined with a back gage having a movement toward and from the work, and means to produce said forward movement in plural steps.

49. A sewing machine containing stitch-forming mechanism and feed mechanism, combined with a back gage having a movement toward and from the work, means to produce said forward movement in plural steps, and means to lock said back gage in its final forward position.

50. A sewing machine containing stitch forming mechanism and feed mechanism, combined with a back gage having a movement toward and from the work, means to produce said forward movement in plural steps, and a welt guide movable toward and from the work and having also a plural step advance movement.

51. A sewing machine containing stitch forming mechanism and feed mechanism, combined with a back gage having a movement toward and from the work, means to produce said forward movement in plural steps, means to lock said back gage in its final forward position, and a welt guide also movable toward and from the work and connected with said back gage to receive plural step movement therefrom.

52. A sewing machine comprising a bed support and a plurality of independent heads mounted thereon and carrying, respectively, working parts of the machine, said heads being removable to afford convenient access to said parts, and means to secure said heads to said support and to each other.

53. A curved needle sewing machine comprising a needle, its carrier, a support for said carrier, and means for actuating said carrier, combined with an awl, its carrier, an independent support therefor, and means for actuating said awl and awl-carrier, said supports being removable to afford convenient access to the parts mounted thereon.

54. A curved needle sewing machine comprising a needle, its carrier, a support for said carrier, and means for actuating said carrier, combined with an awl, its carrier, an independent support therefor, means for actuating said awl and awl-carrier, said supports being removable to afford convenient access to the parts mounted thereon, and feeding means mounted on said awl-carrier support.

In testimony whereof, I have signed my name to this specification, in the presence of two subscribing witnesses.

THOMAS G. PLANT.

Witnesses:
FREDERICK L. EMERY,
FRANCIS A. MILLS.